(12) United States Patent
Trivette

(10) Patent No.: US 8,626,336 B2
(45) Date of Patent: Jan. 7, 2014

(54) AUTOMATED DESTACKING DEVICE AND METHOD

(76) Inventor: Roger Blaine Trivette, Boiling Springs, SC (US)

(*) Notice: Subject to any disclaimer, the term of this patent is extended or adjusted under 35 U.S.C. 154(b) by 138 days.

(21) Appl. No.: 13/232,164

(22) Filed: Sep. 14, 2011

(65) Prior Publication Data

US 2013/0066460 A1  Mar. 14, 2013

(51) Int. Cl.
*G06F 7/00* (2006.01)
*B65H 3/06* (2006.01)

(52) U.S. Cl.
USPC ........... 700/218; 700/217; 700/219; 700/220; 700/223; 271/119

(58) Field of Classification Search
None
See application file for complete search history.

(56) References Cited

U.S. PATENT DOCUMENTS

| | | | |
|---|---|---|---|
| 4,345,752 A | 8/1982 | Nakamura et al. | |
| 4,678,173 A | 7/1987 | Basinger et al. | |
| 5,096,179 A | 3/1992 | Schmitt | |
| 5,494,398 A | 2/1996 | Montemayor et al. | |
| 5,711,519 A | 1/1998 | Bortolotti | |
| 5,813,669 A | 9/1998 | Horii | |
| 5,884,908 A * | 3/1999 | Kato | 271/119 |
| 6,168,150 B1 | 1/2001 | Hori et al. | |
| 2010/0230891 A1* | 9/2010 | Omata | 271/10.09 |

* cited by examiner

*Primary Examiner* — Yolanda Jones
(74) *Attorney, Agent, or Firm* — Southeast IP Group, LLC; Thomas L. Moses

(57) ABSTRACT

An automated destacking device is used to remove a single flat item or sheet from the top of a stack, and to then transport the item from the stack so that it may be used in an assembly line, manufacturing process, or the like. The stacked items are placed into a hopper, and an elevator drives the hopper upwardly until the top item in the stack contacts the underside of a horizontally movable carriage. The underside of the carriage includes an adhesive element, which engages the top item, and then the carriage moves in a horizontal direction away from the stack, carrying the top item from the stack to a position separately from the stack.

3 Claims, 3 Drawing Sheets

AUTOMATED DESTACKING DEVICE AND METHOD

BACKGROUND OF THE INVENTION

The present invention relates generally to devices used to individually remove a flat item from a stack during a manufacturing process. More specifically, the present invention is directed to a robotic device that is capable of receiving a stack of flat items, removing each item individually from the stack, and feeding the individual item into a manufacturing process in a continuous cyclical manner.

Heretofore, a number of different types of devices have been developed for the purpose of removing a single flat sheet of material from a stack, and feeding each individual sheet into a manufacturing or printing process, or an assembly line. Most commonly, such destacking sheet feeders may be found in printers and copiers, where a stack of paper is loaded into a hopper, and the printer or copier feeds a single sheet at a time into the printing process, typically using mechanized rollers to remove the top sheet from the stack for printing.

Other types of destackers and sheet feeders have been developed, as well. U.S. Pat. No. 4,345,752 is directed to a sheet transport apparatus that picks up and transports a topmost sheet of a stack of sheets in a one-by-one manner by using a rotating suction drum to pick up the sheets. U.S. Pat. No. 5,494,398 discloses a device for unstacking tortillas and conveying them to a moving belt by using a rotating cylinder having holes in its surface through which suction acts on the tortillas. Other devices, similarly to printers and copiers, simply use rollers to frictionally engage one sheet or flat item at a time and slide it from the top of the stack.

One problem associated with various destacking devices is that it is difficult for the device to consistently move a single sheet, and sometimes multiple sheets are moved together, when the intent is to move one sheet at a time. Another problem is that rollers used to frictionally engage the stacked items sometimes wear down, creating a lower coefficient of friction, which causes the rollers to simply rotate against the item without forcing any movement thereof. Additionally, the use of suction drums and other suction devices requires the use of a vacuum system, which is a costly component and uses significant amounts of electricity to run. Thus, it would be desirable to provide a destacking device that overcomes these problems associated with the prior art, is inexpensive to manufacture, and consistently transports a single sheet or item at a time in a reliable manner.

BRIEF SUMMARY OF THE INVENTION

In accordance with one aspect of the invention, a destacking device includes a hopper for receiving a stack of flat items, a servo-driven elevator attached to the hopper for raising and lowering the stack of items, a rotary actuator with a pivoting arm that is used to transport a single sheet at a time from the top of the stack, a laser photosensor, and a programmable logic control (PLC). The PLC is programmed to actuate the movement of the various components. An operator manually loads a stack of items into the hopper. The pivoting arm is attached to a shuttle or carriage that moves horizontally between a first position and a second position along a pair of guide rods. The carriage includes, in a preferred embodiment, a pair of needle rings that rotate in a single direction only, for engaging the stacked items, as well as several contact plates having a tacky adhesive such as double sided adhesive tape, on an underside thereof. When the destacking device begins its cycle, the elevator is raised to an upper position until the top of the stack is sensed by the photosensor. In one embodiment, when the photosensor detects the top of the stack, then the elevator raises the stack to a slightly higher, predetermined level, and then the rotary actuator moves the pivoting arm so that the underside of the contact plates comes into contact with the top sheet. The tacky adhesive on the underside of the contact plates engages the top sheet, and the bottom of the needle rings also engages the sheet, and the elevator drops downwardly, leaving the top sheet attached to the contact plates. The pivoting arm then moves the carriage laterally, and the needle rings rotate in the same lateral direction as the motion of the carriage in order to remove the sheet from the underside of the contact plates, thus making the single sheet available to be transported to the next phase of the assembly line, manufacturing process, or the like. Then, the pivoting arm moves the carriage back to the first position, so that it is ready to receive the next top sheet from the stack, thus completing the cycle.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention includes, in a first embodiment, an automated destacking device 10 that is used to remove a single flat item or sheet from the top of a stack, and to then transport the item from the stack so that it may be used in an assembly line, manufacturing process, or the like. Specifically, the automated destacking device 10 may be used in the automotive industry for the small, rectangular textile sheets that are used to connect an airbag panel to the airbag unit within the dashboard of an automobile. It should be understood, however, that this automated destacking device may be employed for any such operation where a stack of flat articles must be destacked so that the individual items may be removed from the stack for further processing or manufacturing activities.

Figure 1:
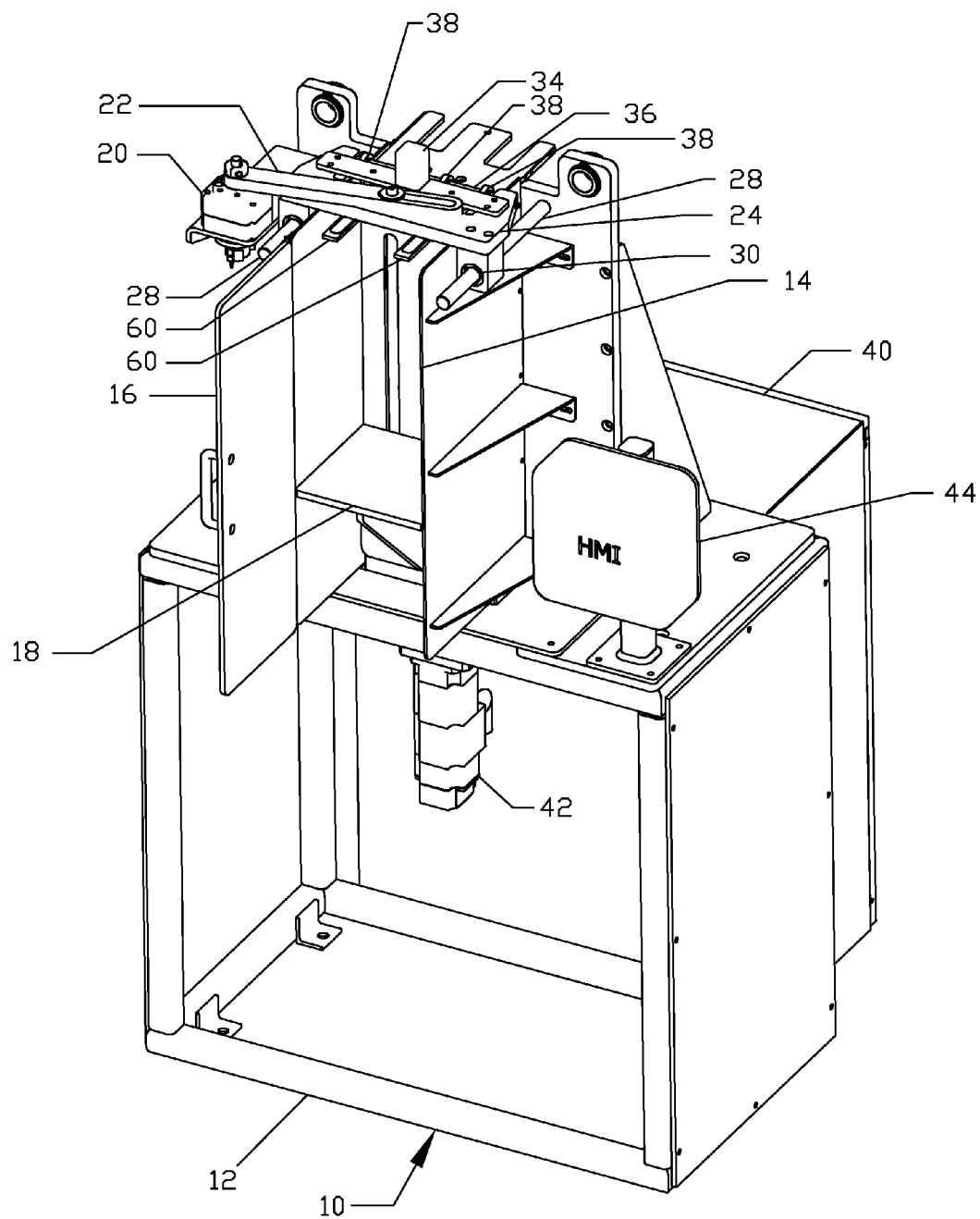
FIG. 1 is a perspective view of one embodiment of an automated destacking device.
Figure 2:
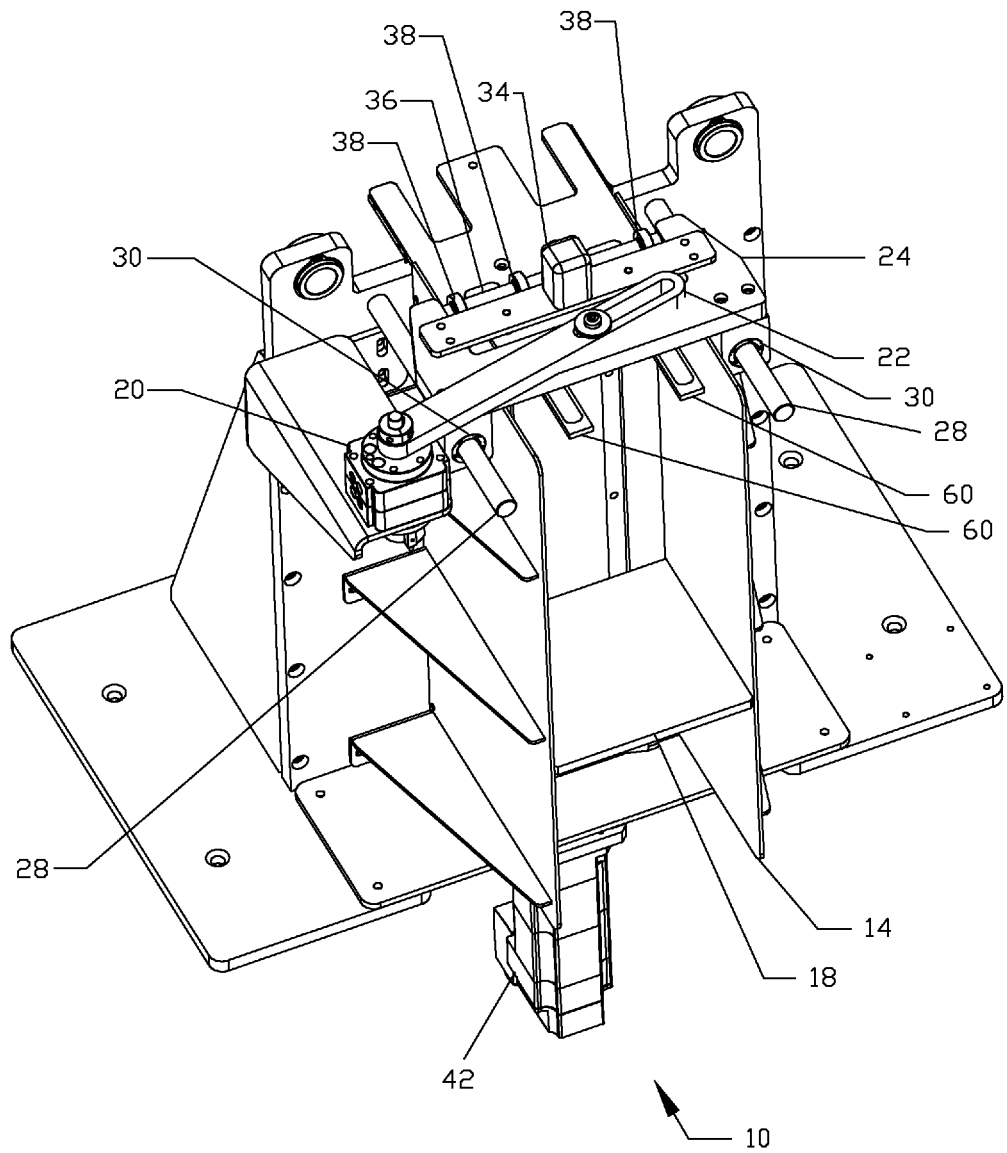
FIG. 2 is a perspective view of another embodiment of an automated destacking device.
Figure 3:
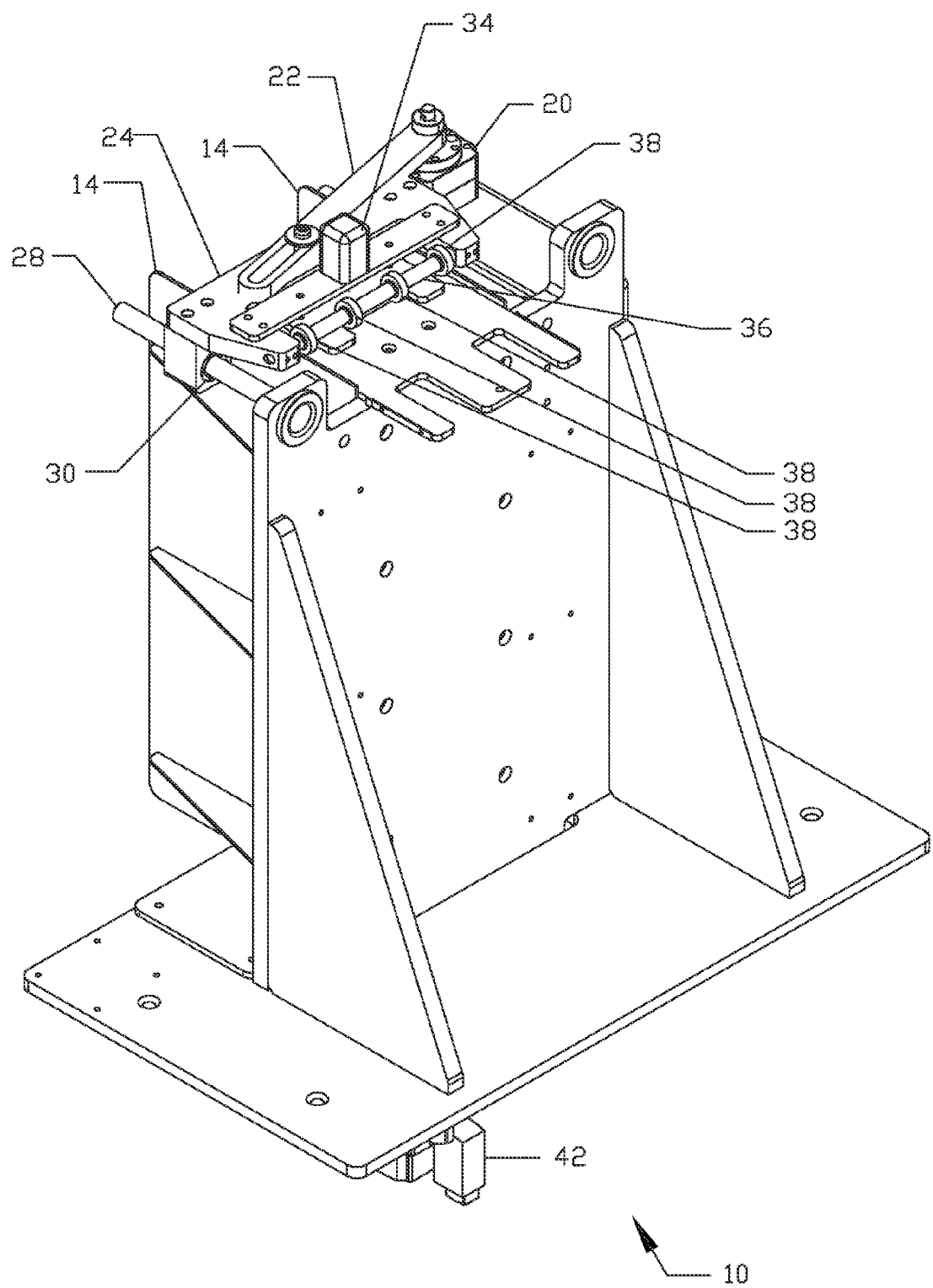
FIG. 3 is a perspective view of the automated destacking device shown in FIG. 2.

As shown in FIG. 1, the destacker 10 includes a frame member 12 to support the various components, and a hopper 14 for receiving a stack of flat articles, including a hinged door 16 that may be secured in a closed position when the stack is in position within the hopper. A servo-driven elevator 18 is attached to frame 12 and the hopper 14 for raising and lowering the hopper 14 and the stack in a vertical direction. The destacker 10 also includes, at a top portion of the frame 12, a rotary actuator 20 with a pivoting arm 22 attached to a shuttle or carriage 24, and a photosensor (not shown) for sensing when the stack is raised to a certain level. The pivoting arm 22 is driven by the rotary actuator 20, and the carriage 24 is positioned on a pair of horizontally disposed guide rods 28, so that the carriage 24 may move horizontally back and forth between a first and a second position. In one embodiment, the carriage 24 defines a pair of horizontal holes 30, and the guide rods 28 slide through the holes 30, allowing the carriage 24 to move in a horizontal direction along the guide rods 28. The carriage 24 further includes a plurality of contact plates (not shown) on a bottom portion thereof, and each contact plate may include a tacky adhesive, such as double-sided adhesive tape on its underside surface. The contact plates are attached to the carriage 24 via a small compressed air cylinder 34, springs, or the like, so that the contact plates may be compressed slightly toward the underside of the carriage 24, and tend to spring back to the decompressed position when no pressure is applied thereto. When the top sheet from the stack comes into contact with the adhesive on the underside of the contact plates, the sheet sticks to the tape, which allows the carriage 24 to transport only the top sheet, rather than the top two or three sheets. The carriage 24 also includes a shaft 36 having, in a preferred embodiment, a pair of needle rings 38 that may freely rotate about the shaft 36 in a single direction, but are locked and do not spin in an opposite direction (accomplished in one embodiment by using Sprague uni-directional bearings).

A programmable logic control (PLC) 40 is operationally connected to the elevator 18, the rotary acutator 20 and the motor(s) 42, and may be programmed and adjusted to make the process flow in a smooth and timely manner, as desired. Additionally, the PLC 40 is operationally connected to the photosensor so that the photosensor provides information to the PLC 40, and the PLC 40 processes that information by generating an output signal as a result of the triggering of the photosensor. In a preferred embodiment, the PLC 40 includes a display 44 and a keyboard, touchscreen, or some other means for data entry, such as a data jack to receive input for programming and adjustment purposes. One preferred PLC is a Siemens product, model number S7-300. The PLC serves as the brain of the unit, and may be programmed to operate the components in any desired manner.

The automated destacking device 10 operates in a cyclical manner. An operator manually inserts a stack of the textile sheets into the hopper 14, and engages the destacker 10 to begin its cycle. The elevator 18 raises the hopper 14 in an upward direction until the top of the stack triggers the photosensor, which is aimed across the elevator shaft in a set position. In a preferred embodiment, when the photosensor is triggered by the top of the stack, that information is sent to the PLC 40, which then sends an instruction to the elevator 18 to rise slightly further to a predetermined level. This predetermined level is calculated so that the top sheet of the stack comes into contact with the contact plates and the bottom portion of the needle rings 38, so that the contact plates are slightly compressed toward the underside of the carriage 24, thereby ensuring sufficient contact and pressure between the top sheet and the tacky adhesive to remove the top sheet from the stack. The elevator 18 is then lowered, together with the stack, leaving the top sheet stuck to the bottom of the contact plates and engaged with the bottom portion of the needle rings 38. Then, the PLC 40 sends a signal to the rotary actuator 20, which actuates the pivoting arm 22 and causes the carriage 24 to slide in a lateral, horizontal direction along the guide rods 28 from a first position to a second position. Upon reaching the second position, the carriage 24 stops, and the single sheet is removed from the underside of the carriage 24, either manually or robotically. As the top sheet is removed, the needle rings 38, which are still engaged with the top sheet, spin about the shaft 36 in the direction necessary for removal, but are prevented from spinning in the opposite direction, as set forth above. Then, the PLC 40 signals the rotary actuator 20 to rotate in the opposed direction, causing the pivoting arm 22 to rotate and the carriage 24 to slide back along the guide rods 28 from the second position to the first position, where the next cycle may begin.

It is contemplated that other components may be substituted for the components set forth herein, in order to perform the same tasks. For instance, it is contemplated that the photosensor may be replaced by another type of proximity device, and that the elevator mechanism may be driven by electric, hydraulic, or pneumatic means.

The automated destacking device 10 is compact and lightweight, so that it may easily be positioned as desired within an assembly line or on a factory floor. It is simple to operate and maintain, and may be manufactured at relatively low cost. The PLC 40 offers the ability to reprogram or adjust the unit with respect to cyclical speed, sequencing, positioning, timing and direction of the various moving components.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An automated destacking device comprising:
   a frame member;
   a hopper for receiving a stack of generally flat articles, said hopper being attached to said frame member and being movable in a vertical direction;
   an elevator member attached to said frame for driving said hopper upwardly and downwardly with respect to said frame member;
   a rotary actuator attached to an upper portion of said frame member;
   a pivoting arm operatively connected to said rotary actuator;
   a carriage movably connected to said pivoting arm, so that said carriage may move in a horizontal direction between a first position and a second position, wherein said carriage also includes at least one contact plate on an underside thereof, and wherein said contact plate includes an adhesive element on an underside thereof for engagement with a flat article; and
   a programmable logic control operatively connected to said elevator and said rotary actuator for controlling the movements and timing thereof;
   wherein said elevator drives said hopper upwardly to a predetermined level until a generally flat item on top of a stack of said flat items comes into contact with said adhesive element on said contact plate; and
   a pair of horizontally disposed guide rods attached to said frame member, wherein said carriage is operatively connected to said guide rods so that said carriage is movable in a horizontal direction along said guide rods;
   wherein said rotary actuator causes said pivoting arm to move in a first direction, thereby causing said carriage to move in a horizontal direction carrying said generally flat item from said first position to said second position.

2. The automated destacking device set forth in claim 1, further comprising a laser photosensor disposed on said frame member adjacent said elevator for sensing when a top portion of a stack of generally flat items reaches a predetermined level in an upward direction.

3. The automated destacking device set forth in claim 1, wherein said carriage further includes a horizontal shaft having at least one needle wheel rotatably disposed thereon.

\* \* \* \* \*